United States Patent
Mazzini et al.

(10) Patent No.: US 7,031,613 B1
(45) Date of Patent: Apr. 18, 2006

(54) CHROMATIC DISPERSION COMPENSATION BY SUB-BAND

(75) Inventors: Marco Mazzini, Milan (IT); Federico Carniel, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 529 days.

(21) Appl. No.: 09/908,109

(22) Filed: Jul. 17, 2001

(51) Int. Cl.
*H04B 10/12* (2006.01)

(52) U.S. Cl. ............... 398/147; 398/79; 398/81; 398/82; 398/84; 398/87; 398/91; 398/149; 398/158; 398/159; 385/24; 385/37; 385/27

(58) Field of Classification Search .......... 398/79, 398/81, 82, 84, 87, 91, 147, 149, 158, 159; 385/24, 37, 27
See application file for complete search history.

(56) References Cited

U.S. PATENT DOCUMENTS

| | | | |
|---|---|---|---|
| 5,809,196 A | 9/1998 | Meli et al. ............... 385/123 |
| 5,943,151 A | 8/1999 | Grasso et al. ............ 356/161 |
| 6,137,604 A * | 10/2000 | Bergano .................... 398/1 |
| 6,243,176 B1 * | 6/2001 | Ishikawa et al. .......... 398/141 |
| 6,445,850 B1 * | 9/2002 | Zhou et al. ................ 385/24 |
| 6,567,577 B1 * | 5/2003 | Abbott et al. ............. 385/24 |
| 6,580,550 B1 * | 6/2003 | Kosaka et al. .......... 359/337.1 |
| 6,603,598 B1 * | 8/2003 | Oliveti et al. ........... 359/341.5 |
| 6,684,004 B1 * | 1/2004 | Tomita .................... 385/24 |
| 6,714,702 B1 * | 3/2004 | Whiteaway et al. ....... 385/24 |
| 6,731,877 B1 * | 5/2004 | Cao ......................... 398/91 |

* cited by examiner

*Primary Examiner*—Hanh Phan
(74) *Attorney, Agent, or Firm*—Aka Chan LLP

(57) ABSTRACT

End of line dispersion compensation is applied on a sub-band by sub-band basis. Adequate end-of-line dispersion compensation may be provided for high data rate WDM systems even for optical link lengths of 1000 km or more. Dispersion compensating gratings (DCGs) may be used as the dispersion compensating components. There is a great savings in cost and package volume compared to per-channel compensation schemes.

18 Claims, 4 Drawing Sheets

US 7,031,613 B1

CHROMATIC DISPERSION COMPENSATION BY SUB-BAND

BACKGROUND OF THE INVENTION

The present invention relates to optical communication systems and more particularly, to systems and methods for compensating for chromatic dispersion in WDM signals.

The explosion of communication services, ranging from video teleconferencing to electronic commerce has spawned a new era of personal and business interactions. As evident in the rapid growth of Internet traffic, consumers and businesses have embraced broadband services, viewing them as a necessity. However, this enormous growth in traffic challenges the telecommunication industry to develop technology that will greatly expand the bandwidth of communication networks. Further improvements in optical communications hold great promise to meet the demand for greater bandwidth.

Wavelength division multiplexing (WDM) technology permits the concurrent transmission of multiple channels over a common optical fiber, thus expanding available bandwidth and providing other advantages in implementation. WDM techniques are increasingly being used to more optimally exploit the data carrying capacity of optical fibers. Current trends in WDM technology include: closer spacing of wavelength components, increasing numbers of WDM channels, higher data rates being carried in each WDM channel, and longer purely optical links with no intermediate regeneration of the optical signal based on recovery of data. In bringing about these advances, one phenomenon that must be overcome is so-called chromatic dispersion wherein different spectral components of a given optical pulse propagate down the fiber at slightly different speeds causing blurring of data-carrying pulses and intersymbol interference.

Chromatic dispersion compensation is thus an important part of the design of an effective WDM system. Increasing data rates, which require narrower pulses that are more sensitive to dispersion, mean that chromatic dispersion must be compensated more precisely. Chromatic dispersion compensation techniques include the use of dispersion compensating fiber and dispersion compensating gratings (DCG's). With the advent of DWDM (dense wave division multiplexing) systems that incorporate purely optical links of length greater than 1000 km and have greater than 200 channels, at 10 Gb/s per channel or smaller numbers of channels at 40 Gb/s per channel, it is necessary to provide optimal chromatic dispersion compensation to each WDM channel.

The degree of chromatic dispersion compensation that is required will vary for each channel. When chromatic dispersion compensation is applied at an intermediate point along the link, it is typically applied to the composite WDM signal rather than to the individual channels to avoid the need for intermediate demultiplexing and remultiplexing. The dispersion compensation can thus be adjusted to be optimal or nearly optimal for channels in the center of the WDM grid, but many channels at the edges will require further dispersion compensation at the receiver site.

FIG. 1 depicts a prior art approach to end-of-line chromatic dispersion compensation. The WDM signal includes 200 channels spaced 25 GHz apart and thus has an overall spectral width of 40 nm. The other channels have already experienced adequate chromatic dispersion compensation but the channels at the grid edges require further compensation. In the scheme of FIG. 1, this compensation is applied on a per-channel basis with the degree of compensation tailored to the chromatic dispersion on each channel.

An optical amplifier 100 preamplifies all of the components of the WDM signal. A deinterleaver 102 divides the 200 channel 25 GHz grid into four 50 channel 100 GHz grids. Each 100 GHz grid is amplified by a separate optical amplifier 104. Each optical amplifier 104 may be an erbium-doped fiber amplifier (EDFA) or a wide band lumped Raman amplifier (LRA) having 40 nm bandwidth. After amplification each of the grids is passed to a demultiplexer 106 that separates the grid into individual channels. The channels requiring dispersion compensation are individually amplified by EDFAs 108 to compensate for the insertion loss introduced by dispersion compensating components. For each channel requiring chromatic dispersion compensation, there is a four port circulator 110 configured in combination with dispersion compensating gratings (DCGs) 112 such that optical energy at the selected wavelength reflects off the gratings and experience the required degree of dispersion compensation. These DGS's 112 are optimized for the degree of compensation required on each channel.

This approach, while providing very precise dispersion compensation on a per-channel basis, carries many drawbacks. In particular, with increasing numbers of WDM channels to be compensated, the component cost becomes prohibitive and the overall package volume also increases to an undesirable extent. What is needed are systems and methods for providing sufficient dispersion compensation to each channel in a WDM system while minimizing cost and volume.

SUMMARY OF INVENTION

End of line dispersion compensation is applied on a sub-band by sub-band basis by virtue of one embodiment of the present invention. Adequate end-of-line dispersion compensation may be provided for high data rate WDM systems even for optical link lengths of 1000 km or more. In some embodiments, dispersion compensating gratings (DCGs) are used as the dispersion compensating components. There is a great savings in cost and package volume compared to per-channel compensation schemes.

A first aspect of the present invention provides apparatus for terminating a WDM link in a WDM communication system. The apparatus includes: a first dispersion compensating element that compensates dispersion of the first sub-band of the WDM signal where the first sub-band includes a first group of channels of the WDM signal. The apparatus further includes a first demultiplexer that demultiplexes the first group of channels onto separate fibers following dispersion compensation by the first dispersion compensating element, and a second demultiplexer that demultiplexes a second sub-band of the WDM signal onto separate fibers. The second sub-band includes a second group of channels and does not overlap the first sub-band.

A further understanding of the nature and advantages of the inventions herein may be realized by reference to the remaining portions of the specification and the attached drawings.

DESCRIPTION OF SPECIFIC EMBODIMENTS

One embodiment of the present invention provides an architecture for performing chromatic dispersion compensation on selected sub-bands of a WDM signal. For example, the present invention may be implemented in the context of a WDM receiver at the end of the WDM link where center channels have been adequately chromatic dispersion compensated but channels nearer the grid edges require further compensation. This application is, however, merely representative and the present invention may be implemented wherever applicable.

Figure 1:
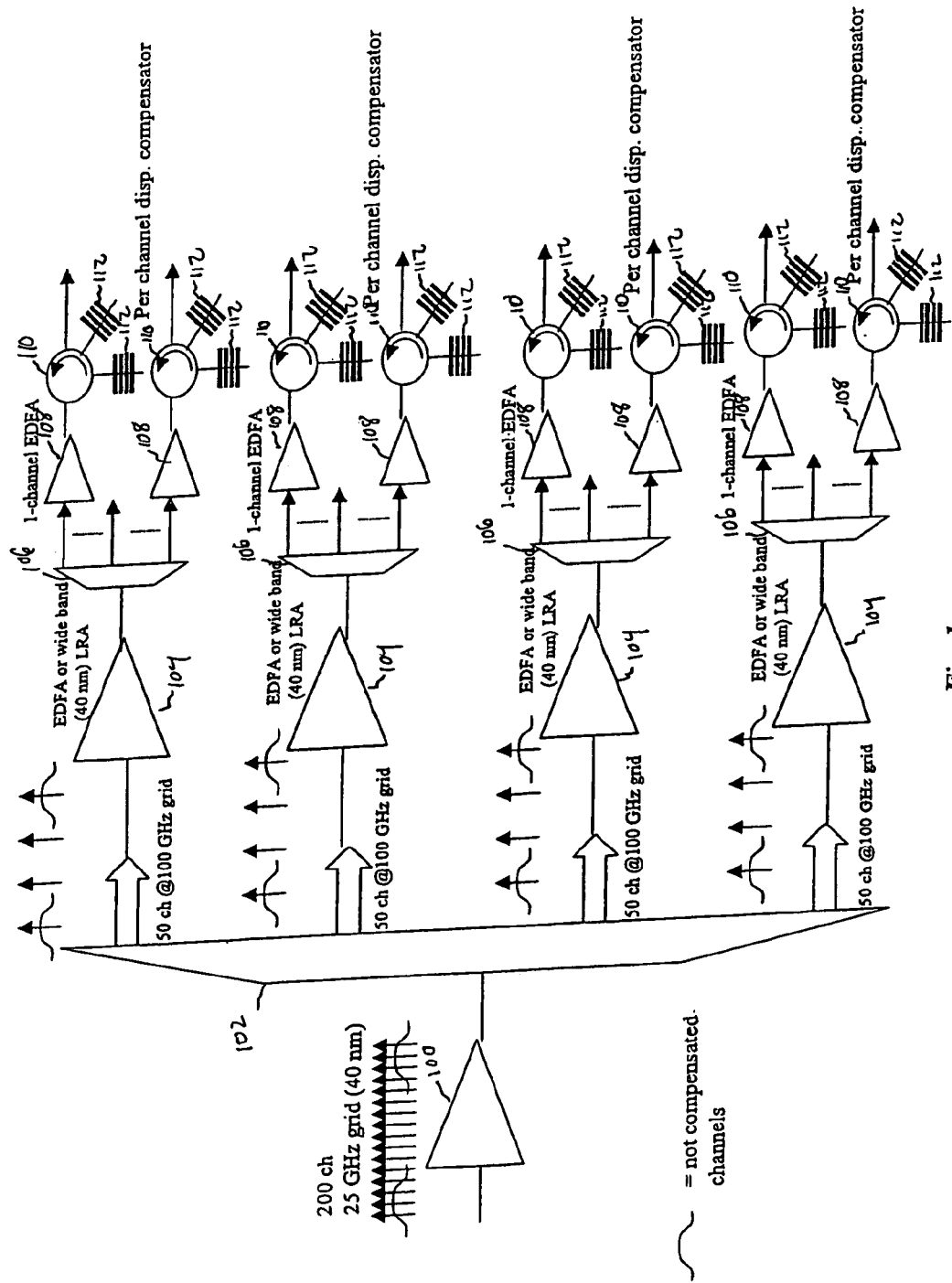
FIG. 1 depicts a prior art approach to end-of-line chromatic dispersion compensation.
Figure 2:
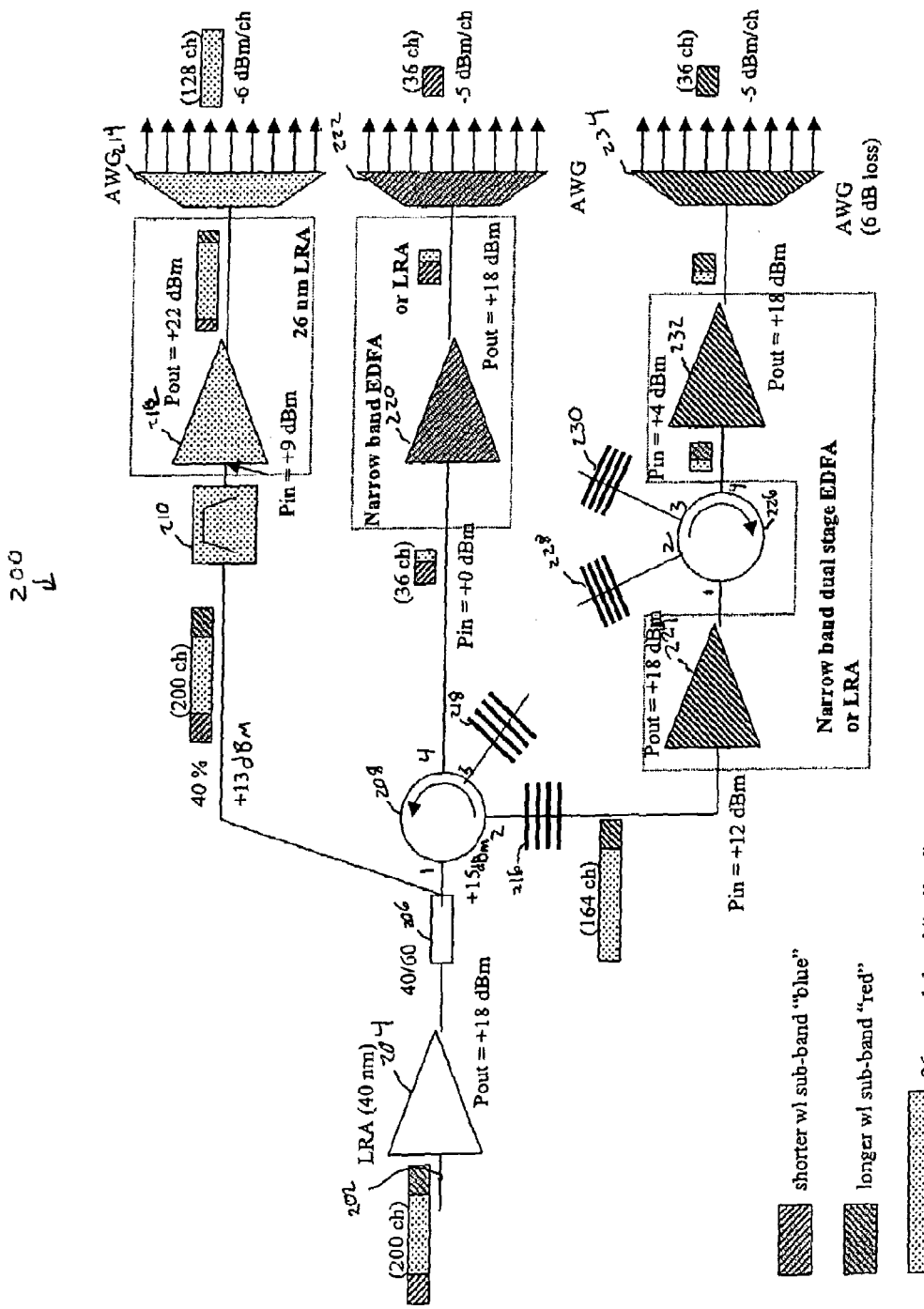
FIG. 2 depicts a chromatic dispersion compensation scheme according to one embodiment of the present invention.

FIG. 2 depicts a chromatic dispersion compensation system 200 according to one embodiment of the present invention. A received WDM signal 202 is considered to have three sub-bands. Of the 200 channels of WDM signal 202, 128 channels, corresponding to 26 nm of bandwidth, are referred to herein as a "yellow" sub-band. A shorter wavelength sub-band having 36 channels is referred to as the "blue" sub-band and a sub-band having longer wavelength than than the yellow sub-band also has 36 channels and is referred to as the "red" sub-band. The yellow sub-band is considered to not require further chromatic dispersion compensation because previously applied chromatic dispersion compensation tailored to the center wavelength of the WDM signal has been sufficient to adequately chromatic dispersion compensate these 128 channels. However, the blue and red sub-bands, being too widely separated from the center wavelength, require further chromatic dispersion compensation.

A lumped Raman amplifier (LRA) 204 having a bandwidth of 40 nm amplifies all of the components of the WDM signal 202 to a power level of +18 dBm. A splitter 206 directs 40% of the output power of LRA 204 for processing tailored to the yellow sub-band. This corresponds to approximately +13 dBm of power. The remaining 60% of the output power of LRA 204, corresponding to +15 dBm, is directed to a four-port circulator 208 for processing tailored to the red sub-band and blue sub-band.

Referring now to the processing of the yellow sub-band signal, an optical bandpass filter 210 substantially attenuates the red and blue sub-band components while passing the yellow sub-band. A lumped Raman amplifier (LRA) 212 amplifies the output of bandpass filter 210 to a power level of +22 dBm. LRA 212 has a bandwidth of 26 nm. A portion of the red and blue sub-band energy still remains at this point. A demultiplexer 214 demultiplexes each of the 128 channels of the yellow sub-bard onto individual fiber outputs. The individual channel outputs have a power of −6 dBm per channel. The multiplexer 214 may be implemented as an arrayed waveguide grating (AWG) as known in the art.

Now referring to the blue and red sub-bands which are subject to further chromatic dispersion compensation, the WDM signal output by splitter 206 enters circulator 208 via a port 1 and then exits via a port 2 to encounter a dispersion compensating grating DCG 216 configured to reflect the blue sub-band and also provide chromatic dispersion compensation for the blue sub-band. One implementation of DCG 216 is the DCU-G-y-z-xx Grating Dispersion Compensating Module available from Corning, Inc. This module provides positive or negative post-compensation through a grating based scheme. In the part number, y is a positive or negative sign to define the sense of compensation and z defines the absolute value of compensation in ps/nm provided at a center wavelength defined by xx. The channels transmitted through the DCG are not subject to grating-induced amplitude ripple.

Referring now to further processing of the blue sub-band, once reflected off DCG 216, the blue sub-band channels return into circulator 208 via port 2 and exit via port 3 to encounter another DCG 218 also tuned to the blue sub-band. Thus the blue sub-band components reflect off of DCG 218, having experienced further chromatic dispersion compensation, reenter circulator 208 via port 3 and then exit circulator 208 via port 4. The power level at this point is estimated to be +0 dBm and a small portion of the yellow sub-band energy remains. A narrowband EDFA 220 amplifies the port 4 output of circulator 208. Alternatively, an LRA could be used here. The estimated power output of amplifier 220 is +18 dBm. A demultiplexer 222, depicted here as an AWG, then separates out the 36 blue sub-band channels onto individual channels. The blue sub-band has thus been amplified and has also experienced further chromatic dispersion compensation.

Now considering further processing of the red sub-band signal, both the yellow and red sub-band channels pass through DCG 216 into an EDFA (or LRA) 224. The input power to EDFA 224 is +12 dBm and the output power is +18 dBm. The output of EDFA 224 is input to port 1 of a four-port circulator 226. This amplified yellow and red sub-band energy is then output from circulator 226 via port 2 to encounter a DCG 228 that is configured to reflect and dispersion compensate the red sub-band but pass the yellow sub-band. The red sub-band is thus reflected back into circulator 226 via port 2 to then exit again via port 3 to a DCG 230 which also reflects and dispersion compensates the red sub-band. The red sub-band energy that reenters via port 3 of circulator 226 exits via port 4 to be input to an EDFA (or LRA) 232. At this point, some yellow sub-band energy remains. The input power to EDFA 232 is approximately +4 dBm and the output power is approximately +18 dBm. Noise figure performance is improved by separating the amplification into two stages with the chromatic dispersion compensating elements between the two stages. In the example, this separation into two stages is implemented for the red sub-band because the red sub-band experiences greater insertion loss. A demultiplexer 234, depicted here as an AWG, then separates the 36 red sub-band channels onto separate fibers.

Figure 3:
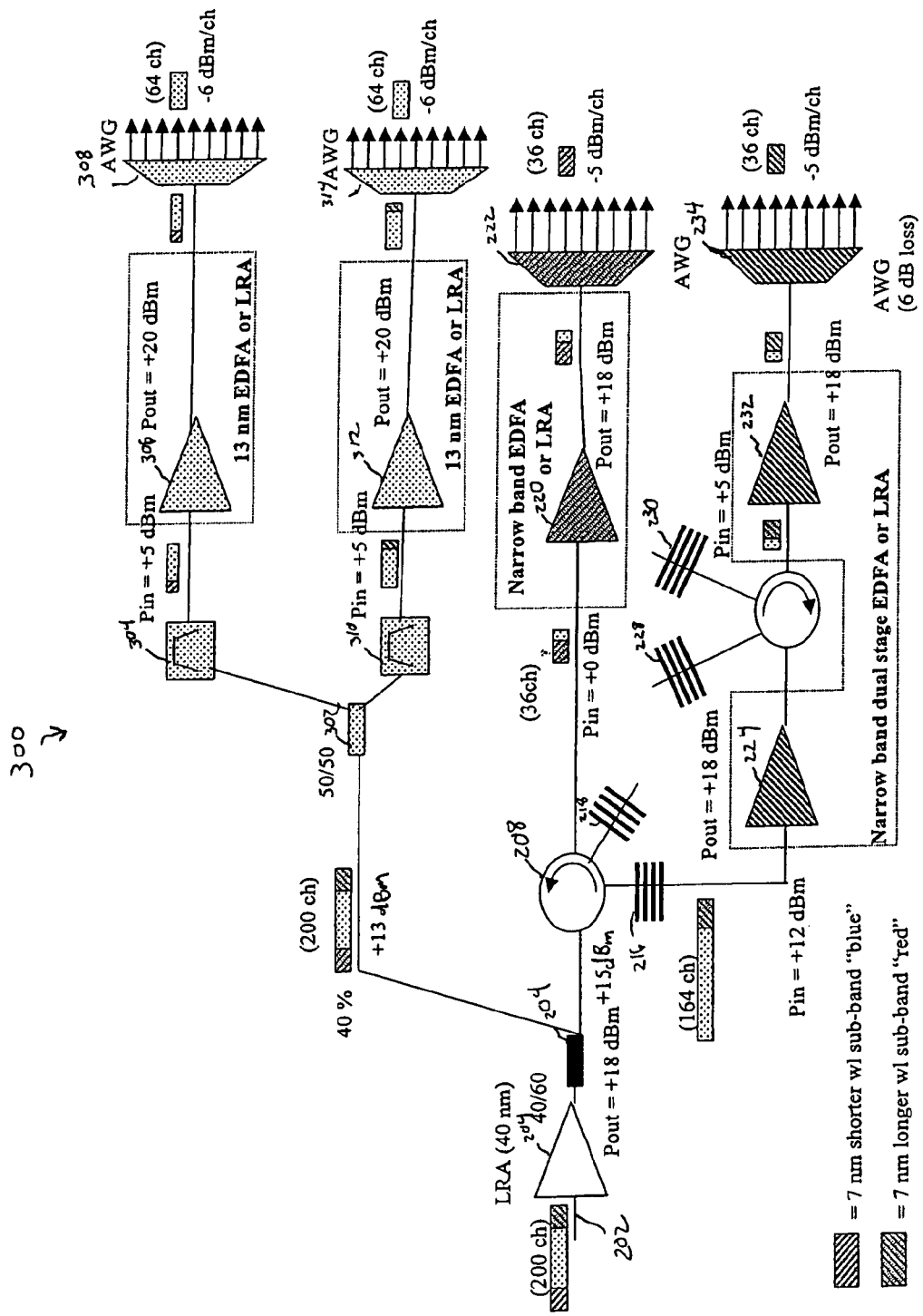
FIG. 3 depicts a chromatic dispersion compensation scheme wherein two sub-bands are not dispersion compensated according to one embodiment of the present invention.

FIG. 3 depicts a chromatic dispersion compensation system 300 that implements an alternative embodiment of the present invention wherein two central sub-bands do not require further chromatic dispersion compensation. The blue and red sub-bands are handled as in chromatic dispersion compensation system 200 of FIG. 2. Therefore, similar components are depicted for handling these sub-bands and given the same reference designators as shown in FIG. 2. The yellow sub-band of FIG. 2 is here however, divided into two sub-bands of 64 channels each. This approach reduces channel cross-talk at the demultiplexer outputs and reduces gain tilt across the sub-bands. A splitter 302 divides the optical signal allocated for yellow sub-band processing onto two optical fibers. Considering now the processing of the lower 64 channels, a bandpass filter 304 substantially attenuates optical energy outside the lower 64 channels, and an EDFA (or LRA) 306 amplifies this lower yellow sub-band. EDFA 306 has an estimated input power of +5 dBm and an estimated output power of +20 dBm. EDFA 306 has a bandwidth of 13 nm corresponding to the spectrum occupied by the 64 channels. A demultiplexer 308, depicted as an AWG, demultiplexes the 64 channels onto individual fibers. A bandpass filter 310, an EDFA (or LRA) 312 and a demultiplexer 314 perform a similar role for the upper yellow sub-band that also has 64 channels.

Figure 4:
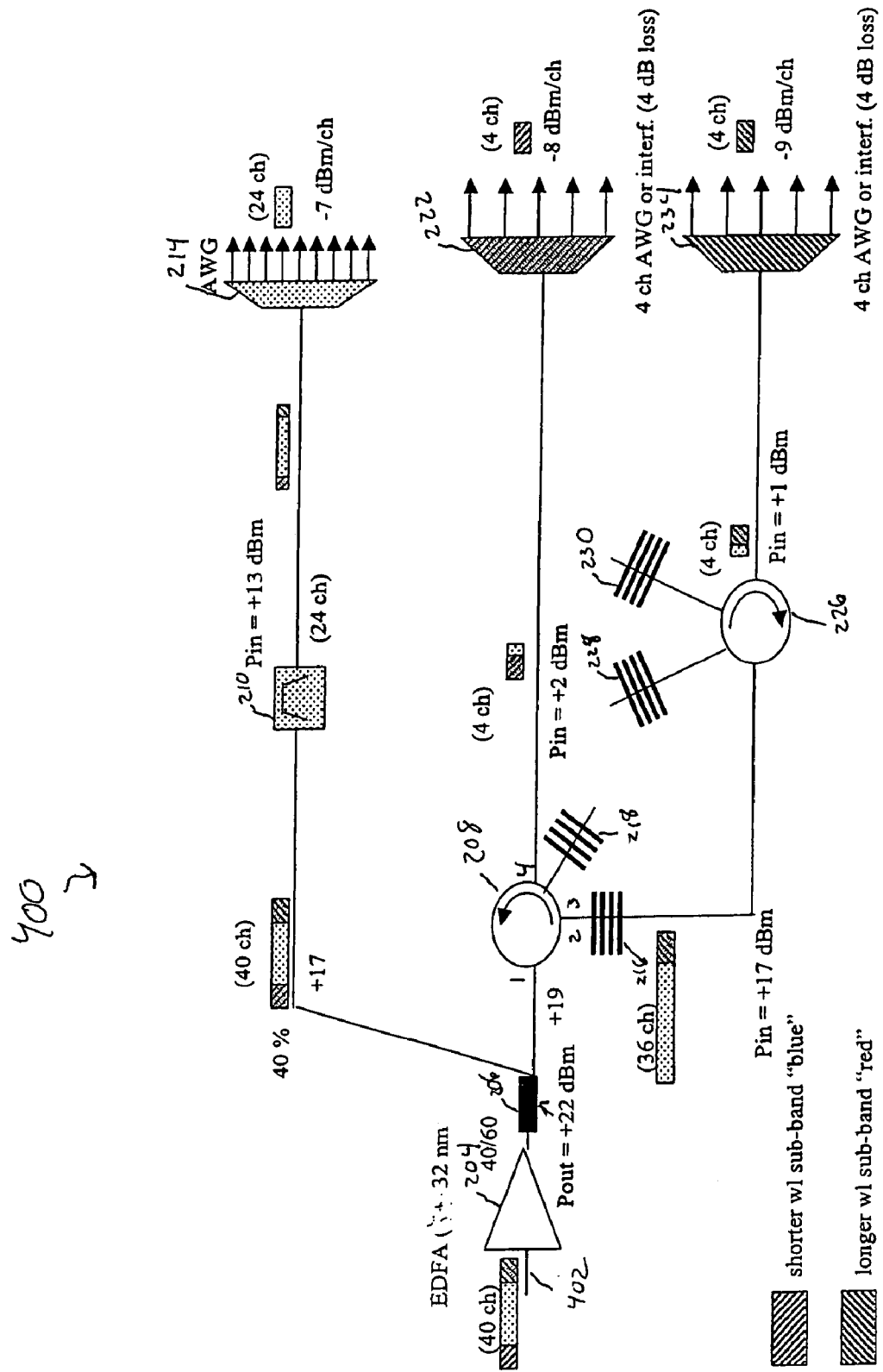
FIG. 4 depicts a chromatic dispersion scheme relying principally on passive components according to one embodiment of the present invention.

FIG. 4 depicts a chromatic dispersion compensation system 400 according to one embodiment of the present invention. Chromatic dispersion compensation system 400 is an example of an implementation of a low channel count WDM system where it is advantageous to use passive components only. A WDM signal 402 includes 40 channels. The 40 channels are divided into three sub-bands: a center yellow sub-band having 24 channels, a lower blue sub-band including 4 channels, and an upper red sub-band including 4 channels. Here, LRA 204 has a power output of +22 dBm and a bandwidth of 32 nm. Yellow band processing is handled through bandpass filter 210 which here has an expected input power into demultiplexer 214 of +13 dBm. Demultiplexer 214 separates the 24 yellow sub-band channels onto separate fibers. Each channel has an expected power level of −7 dBm per channel.

Circulators 208, 226, and DCGs 216, 218, 228, and 230 perform functions similar to those as depicted in FIGS. 2–3 but system 400 omits active amplification components to achieve a lower cost implementation. Demultiplexer 222 separates the blue sub-band into four channels having an estimated power level of −8 dBm/ channel. Demultiplexer 234 separates the red sub-band into four channels having an estimated power level of −9 dBm/channel. The expected input power level to the demultiplexer 222 is +2 dBm. The expected power input to demultiplexer 234 is +1 dBm for the red sub-band. Optionally, interference filter structures may be used instead of AWGs for demultiplexers 222 and 234.

The passive components implementation scheme of FIG. 4 may also be extended to divide the yellow sub-band into two sub-bands not requiring further chromatic dispersion compensation as was shown in FIG. 3. It should also be noted that it is possible to accommodate the chromatic dispersion scheme of the present invention to modular growth of WDM system capacity. Components may be added on a sub-band by sub-band basis as further groups of WDM channels are added to the system.

The above describes representative examples of performing chromatic dispersion compensation on a sub-band by sub-band basis according to the present invention. In an alternative scheme according to the present invention, a 200 channel grid, for example, is divided into four 50 channel grids by a deinterleaver. Each of these grids is then demultiplexed into individual channels which are then remultiplexed onto several fibers corresponding to individual sub-bands. Chromatic dispersion compensation is then applied to each sub-band requiring it and a series of demultiplexers is used to redivide each sub-band into its constituent WDM channels.

The chromatic dispersion compensation scheme that has been presented here has many advantages. Since dispersion compensation is applied on a sub-band by sub-band basis, there is a great savings in components over schemes that provide chromatic dispersion compensation for individual channels. Changes in channel bit rate may be accommodated without changes in chromatic dispersion components. Adding new channels or modifying channel spacing within existing sub-bands may only require modification to the final demultiplexers. Adding new sub-bands can be accomplished by adding new components to process the new sub-bands without the need to modify components used to process the existing sub-bands. Also, in the embodiments that have been described, relatively narrow band amplifiers are used wherever feasible, thereby reducing gain tilt.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the numbers of channels, spacings, wavelengths, power levels, amplifier gains described herein are merely examples and may be freely modified within the scope of the present invention.

What is claimed is:

1. In a WDM communication system, apparatus for terminating a WDM link comprising:
   a splitter splitting a WDM signal on said WDM link into a first portion and a second portion;
   a circulator receiving the first portion;
   a first dispersion compensating element that compensates dispersion of a first subband of the first portion, said first subband comprising a first group of adjacent channels of said WDM signal, said first dispersion compensating element comprising a dispersion fiber grating coupled to said circulator;
   a first demultiplexer that demultiplexes said first group of channels onto separate fibers for each channel following dispersion compensation by said first dispersion compensating element;
   a second demultiplexer that demultiplexes a second subband of said first portion onto separate fibers for each channel, said second subband comprising a second group of adjacent channels and not overlapping said first subband, said second demultiplexer serially coupled to said circulator after said first dispersion compensating element.

2. The apparatus of claim 1 further comprising:
   a second dispersion compensating element that compensates dispersion of said second subband, said second dispersion compensating element serially coupled to said circulator after said first dispersion compensating element.

3. The apparatus of claim 2 further comprising:
   a third demultiplexer that demultiplexes a third subband of said WDM signal with said second portion from said splitter, said third subband comprising a third group of adjacent channels and not overlapping said first subband or said second subband, onto separate fibers.

4. The apparatus of claim 3 wherein said third subband is between said first subband and said second subband and is not dispersion compensated within said apparatus.

5. The apparatus of claim 1 further comprising an amplifier connected between said first dispersion compensating element and said first demultiplexer.

6. The apparatus of claim 1 further comprising:
   a first amplifier providing input to said first dispersion compensating element; and
   a second amplifier connected between said first dispersion compensating element and said first demultiplexer.

7. In a WDM communication system, a method for terminating a WDM link comprising:
   splitting n WDM signal on said WDM link into a first portion and a second portion;
   circulating said first portion through a circulator;
   compensating for dispersion of a first subband of said first portion by employing a first dispersion fiber grating, said first subband comprising a first group of adjacent channels of said WDM signal, wherein said first dispersion fiber grating transmits without reflection a second subband of said first portion;

demultiplexing said first group of channels onto separate fibers after compensating for dispersion of said first subband; and demultiplexing said second subband of said first portion onto separate fibers, said second subband comprising a second group of adjacent channels and not overlapping said first subband.

8. The method of claim 7 further comprising:
compensating for dispersion of said second subband.

9. The method of claim 7 further comprising:
demultiplexing a third subband of said WDM signal with said second portion, said third subband comprising a third group of adjacent channels and not overlapping said first subband or said second subband, onto separate fibers.

10. The method of claim 9 wherein said third subband is between said first subband and said second subband.

11. The method of claim 7 further comprising: after compensating for dispersion of said first subband and before demultiplexing said first subband, amplifying said first subband.

12. The method of claim 7 further comprising:
prior to compensating for dispersion of said first subband, amplifying said first subband; and
after compensating for dispersion of said first subband and prior to demultiplexing said first subband; amplifying said first subband again.

13. In a WDM communication system, apparatus for terminating a WDM link comprising:
means for splitting a WDM signal on said WDM link into a first portion and second portion;
means for circulating said first portion:
a first dispersion compensating means for compensating for dispersion of a first subband of said first portion, said first subband comprising a first group of adjacent channels of said WDM signal;

means for demultiplexing said first group of channels onto separate fibers after dispersion compensation by said first dispersoncompensating means; and means for demultiplexing a second subband of said first portion onto separate fibers, said second subband comprising a second group of adjacent channels and not overlapping said first subband, said means for demultiplexing said second subband serially coupled to said means for circulating after said first dispersion compensating means.

14. The apparatus of claim 13 further comprising:
a second dispersion compensating means for compensating for dispersion of said second subband.

15. The apparatus of claim 14 further comprising:
means for demultiplexing a third subband of said WDM signal with said second portion comprising a third group of adjacent channels and not overlapping said first subband or said second subband onto separate fibers.

16. The apparatus of claim 15 wherein said third subband is between said first subband and said second subband.

17. The apparatus of claim 13 further comprising:
means for amplifying said first subband connected between said first dispersion compensating means and said means for demultiplexing said first subband.

18. The apparatus of claim 13 further comprising:
first means for amplifying said first subband prior to dispersion compensating by said first dispersion compensating means; and
second means for amplifying said first subband connected between said first dispersion compensating means and said means for demultiplexing said first subband.

* * * * *